(12) United States Patent  
Kanda

(10) Patent No.: US 7,525,898 B2  
(45) Date of Patent: Apr. 28, 2009

(54) INFORMATION PLAYBACK APPARATUS, IN-LINE CIRCUIT, AND METHOD FOR IMPLEMENTING IN-LINE CIRCUIT ON INFORMATION PLAYBACK APPARATUS

(75) Inventor: Yoshihiro Kanda, Toyono-gun (JP)

(73) Assignee: Panasonic Corporation, Osaka (JP)

( * ) Notice: Subject to any disclaimer, the term of this patent is extended or adjusted under 35 U.S.C. 154(b) by 805 days.

(21) Appl. No.: 10/973,353

(22) Filed: Oct. 27, 2004

(65) Prior Publication Data

US 2005/0117502 A1    Jun. 2, 2005

(30) Foreign Application Priority Data

Oct. 28, 2003    (JP)    ............... 2003-367229

(51) Int. Cl.  
*G11B 7/005*    (2006.01)

(52) U.S. Cl. ................................. 369/124.13

(58) Field of Classification Search ........................ None  
See application file for complete search history.

(56) References Cited

U.S. PATENT DOCUMENTS

| | | | | |
|---|---|---|---|---|
| 4,614,863 A | * | 9/1986 | Sato | ........................ 250/201.5 |
| 4,764,913 A | * | 8/1988 | Sasaki et al. | ............. 369/53.29 |
| 5,036,322 A | * | 7/1991 | Barrow et al. | ............... 341/144 |
| 5,566,143 A | * | 10/1996 | Minami et al. | ........... 369/44.36 |
| 5,570,335 A | * | 10/1996 | Ogata et al. | ............ 369/124.05 |
| 5,956,299 A | * | 9/1999 | Aoki | ........................ 369/30.15 |
| 6,438,080 B1 | * | 8/2002 | Shoji et al. | ............... 369/47.28 |
| 6,452,897 B1 | * | 9/2002 | Van Den Enden | ........ 369/275.1 |
| 6,721,251 B2 | * | 4/2004 | Kojima et al. | ............ 369/47.54 |
| 2002/0057633 A1 | * | 5/2002 | Nakamura et al. | ........ 369/47.25 |
| 2004/0240346 A1 | * | 12/2004 | Yoshioka | ................. 369/47.27 |
| 2005/0073932 A1 | * | 4/2005 | Shihara et al. | ........... 369/59.21 |

FOREIGN PATENT DOCUMENTS

| | | |
|---|---|---|
| JP | 9-320076 | 12/1997 |
| JP | 2003-51119 | 2/2003 |
| WO | WO03056558 A1 * | 7/2003 |

OTHER PUBLICATIONS

ECMA, Standard ECMA-272 (120 mm DVD Rewritable Disk (DVD-RAM), Jun. 1999, 2nd Edition, pp. 1-11 and 35-44.*

* cited by examiner

*Primary Examiner*—Michael V. Battaglia  
(74) *Attorney, Agent, or Firm*—Wenderoth, Lind & Ponack, L.L.P.

(57) ABSTRACT

An information playback apparatus comprises an input amplifier to which an RF signal reproduced from an optical disc is input; a high-pass filter to which the output of the input amplifier is input; an AD converter to which the output of the high-pass filter is input; a lag lead filter to which the output of the AD converter is input; and a demodulator for digitally processing the output of the lag lead filter to demodulate it as a binary signal. Thereby, an optical disc playback apparatus that realizes a DVD-RAM playback function at low cost can be realized.

6 Claims, 11 Drawing Sheets

$$\frac{1+T_2S}{1+T_1S}$$

INFORMATION PLAYBACK APPARATUS, IN-LINE CIRCUIT, AND METHOD FOR IMPLEMENTING IN-LINE CIRCUIT ON INFORMATION PLAYBACK APPARATUS

FIELD OF THE INVENTION

The present invention relates to an optical disc playback apparatus as an information playback apparatus and, more particularly, to an in-line circuit for canceling a difference in DC levels between an optical playback signal in an address area (hereinafter referred to as an ID area) and an optical playback signal in a data area, which optical playback signals are read from tracks formed on an optical disc by an optical pickup. The invention also relates to a method for implementing the in-line circuit on the optical disc playback apparatus.

BACKGROUND OF THE INVENTION

Japanese Published Patent Application No. 2003-51119 (Page 4, FIGS. 30 and 31) has proposed an example of an in-line circuit for an optical disc playback apparatus that plays a DVD-RAM disc as an information storage medium.

FIG. 8 is a diagram illustrating the whole construction of an optical disc playback apparatus using an in-line circuit of this type.

With reference to FIG. 8, an in-line circuit 400 is placed between an optical pickup 300 which reads information from tracks formed on a DVD-RAM disc 200 as an information storage medium, and a signal processing circuit 500 which processes a playback signal. Further, a system controller 600 controls the whole of the optical disc playback apparatus, that is, it controls the signal processing circuit 500, the rpm of a spindle motor (not shown) for rotating the DVD-RAM disc 200, tracking of the optical pickup 300, and the like.

FIG. 9 shows the specific construction of the in-line circuit 400 included in the optical disc playback apparatus. With reference to FIG. 9, reference numeral 51 denotes an input amplifier for amplifying an RF signal that is an optical playback signal from the optical pickup 300 shown in FIG. 8; numerals 52 and 53 denote external capacitors for correcting the DC level of the optical playback signal that is amplified by the input amplifier 51; numerals 54 and 55 denote switches for selecting one of the capacitors 52 and 53 according to an ID area discrimination signal 62; and numerals 56 and 57 are resistors for determining the time constant of DC level correction, in combination with the capacitors 52 and 53. Further, reference numeral 58 denotes a switch for rapidly correcting fluctuations in DC level of the optical playback signal according to a pull-in signal 63; numeral 59 denotes a buffer amplifier for amplifying the optical playback signal after the DC correction; numeral 60 denotes an AD converter for performing AD (analog-to-digital) conversion on the output signal of the buffer amplifier 59; and numeral 61 denotes a slicer as a comparator for binarizing the output signal of the AD converter 60, and outputting the result to the signal processing circuit 500 shown in FIG. 8. Further, reference numeral 62 denotes an ID area discrimination signal that turns on either of the switches 54 and 55, and numeral 63 denotes a pull-in signal that turns on/off the switch 58. The in-line circuit 400 is composed of the respective circuits placed before the AD converter 60, i.e., the input amplifier 51, the external capacitors 52 and 53, the switches 54 and 55, the resistors 56 and 57, the switch 58, and the buffer amplifier 59.

In the in-line circuit 400, the resistor 57 constitutes a high-pass filter in combination with either of the capacitors 52 and 53, and this high-pass filter removes DC components from the optical playback signal without adversely affecting group-delay characteristics of the RF signal. Usually, the cut-off frequency of the high-pass filter is set to about 100 Hz. The resistor 56 is inserted in parallel to the resistor 57 by the switch 58 in order to reduce the time constant of the high-pass filter, that is, to hasten convergence of waveform when the DC components are removed.

FIGS. 10(a)-10(d) illustrate the operation waveforms of the in-line circuit shown in FIG. 9. FIG. 10(a) shows an optical playback signal that is obtained by reading the track on the disc 200 with the optical pickup 300, which is an input signal to the input amplifier 51. In FIG. 10(a), an area where the DC level is high indicates an ID area, and an area other than the ID area indicates a data area. FIG. 10(b) shows an ID area discrimination signal 62 which becomes "High" when a portion of the track corresponding to the ID area is played, thereby to turn on the switch 54 and off the switch 55. At other times, the ID area discrimination signal 62 turns on the switch 55 and off the switch 54. FIG. 10(c) shows a pull-in signal which becomes "High" for a predetermined period from a playback area switching point, i.e., a point in time when the playback area is switched between the data area and the ID area, thereby to turn on the switch 58. FIG. 10(d) shows an input signal to the AD converter 60.

FIG. 11 is a diagram for explaining the structure of the ID section of the DVD-RAM disc, wherein 100 denotes marks which are recorded in grooves (guide grooves) and in a land sandwiched between the grooves, and 101 denotes embossed marks formed in the ID area.

As shown in FIG. 11, since the data area of the track is of the land-groove structure, even a portion with no mark 100 does not have the maximum reflectivity. However, since the ID area is of the embossed structure, a portion with no embossed mark 101 has mirror reflectivity. Therefore, as shown in FIG. 10(a), the DC level of the playback signal in the data area is significantly different from that in the ID area.

By the way, the input range of the AD converter 60 is set in accordance with the amplitude of the RF component of the playback signal as shown in FIG. 10(a), and it is smaller than the amplitude including the above-mentioned DC level fluctuations. So, it is necessary to perform AD conversion while suppressing the DC level fluctuations.

Therefore, as shown in FIG. 9, the data area capacitor 52 and the ID area capacitor 53 are used in combination as coupling capacitors, and switching between the capacitors 52 and 53 is performed by controlling the switches 54 and 55 with the ID area discrimination signal 62, thereby generating a signal having a uniform DC level as shown in FIG. 10(d).

Thereafter, in order to speedily carry out charging of the DC voltage to the data area and the ID area, a resistor 56 against the capacitors 52 and 53 is inserted in parallel to the resistor 57 by the switch 58, whereby the time constant is reduced, and convergence of the playback signal at the ID area start point and end point is speeded up.

As described above, in the in-line circuit of the conventional optical disc playback apparatus, when a track formed on an optical disc is played, it is necessary to switch between the coupling capacitors 52 and 53 according to whether the area being played is an ID area or a data area. In order to carry out this switching, a circuit for generating an ID area discrimination signal is needed besides the in-line circuit.

FIG. 12 is a block diagram illustrating a circuit for generating an ID area discrimination signal, and FIG. 13 shows the operation waveform thereof.

In FIG. 12, reference numeral 80 denotes a photoreceptor of the optical pickup 300 shown in FIG. 8, and the photoreceptor 80 is divided into four parts with respect to the track direction of the optical disc. Reference numerals 81 and 82 denote adders, and numeral 83 denotes a subtracter. The adders 81 and 82 calculate the sum of the outputs from the photoreceptors A and D and the sum of the outputs from the photoreceptors B and C, respectively, and the subtracter 83 subtracts the output signal of the adder 82 from the output signal of the adder 81, thereby generating a differential RF signal. Reference numeral 84 denotes a buffer amplifier for amplifying the differential RF signal. Reference numerals 85 and 86 denote a resistor and a capacitor which constitute a high-pass filter, respectively, and the high-pass filter removes DC components from the differential RF signal outputted from the buffer amplifier 84, thereby assisting the subsequent-stage processing using threshold values. Reference numeral 87 denotes a buffer amplifier for amplifying the output of the high-pass filter. Reference numerals 90 and 91 denote comparators for comparing the differential RF signal outputted from the buffer amplifier 87 with an upper threshold value 88 and a lower threshold value 89, respectively. Reference numeral 92 denotes an OR circuit for generating an OR of the output signals of the comparators 90 and 91, and numeral 93 denotes a monostable multi vibrator (hereinafter referred to as a mono multi circuit) for removing RF frequencies from the output signal of the OR circuit 92, thereby to waveform-shape the signal into continuous binary signals.

Further, FIG. 13(*a*) shows the differential RF signal in the data area and the ID area, and the levels of the upper threshold value 88 and lower threshold value 89. FIG. 13(*b*) shows the output of the upper comparator 90, FIG. 13(*c*) shows the output of the lower comparator 91, and FIG. 13(*d*) shows the output of the mono multi circuit 93.

As shown in FIG. 11, each embossed mark 101 in the ID area of the DVD-RAM disc is formed in a position that is ½ track offset from the center of the data track constituted by the lands and the grooves, and therefore, the differential RF signal in the ID area is offset upward and downward with respect to the RF signal in the data area as shown in FIG. 13(*a*). The ID area can be detected by detecting this offset. Although, in the example shown in FIG. 11, the differential RF signal is offset upward in the first half of the ID area and downward in the second half of the ID area, the reverse may occur. In the input signal to the in-line circuit shown in FIG. 9, the whole ID area is offset upward with respect to the data area, as shown in FIG. 10(*a*). This is because the in-line circuit receives not the differential RF signal but the total sum of the output signals from the four photoreceptors of the optical pickup 4.

In the ID area discrimination signal generation circuit shown in FIG. 12, the comparators 90 and 91 compare the waveform shown in FIG. 13(*a*) with the upper threshold value 88 and the lower threshold value 89, thereby detecting the upper and lower offsets, respectively. The signals thus obtained are shown in FIGS. 13(*b*) and 13(*c*), and these signals are unified and shaped to generate an ID area discrimination signal shown in FIG. 13(*d*).

In recent years, cost reduction has rapidly proceeded for the optical disc playback apparatus, and it is urgently needed to streamline the circuits in the apparatus in response to the cost reduction.

As for the in-line circuit, it is difficult to incorporate the coupling capacitors into a LSI, and therefore, external capacitors should be provided. Thereby, the number of terminals of the LSI increases, and a special circuit for generating a timing signal (switching signal) such as an ID area discrimination signal is required to realize in-line control, leading to an increase in cost for DVD-RAM playback.

As a countermeasure against the above-mentioned problem, it is considered that the playback signal from the optical disc is AD-converted and then inputted to a high-pass filter having a cut-off frequency of 100 Hz, thereby to dispense with the coupling capacitors. However, since the optical disc playback signal includes DC level fluctuations as described above and therefore its input dynamic range is large, a high-performance AD converter is required for AD-converting the playback signal, which conversely causes an increase in cost.

SUMMARY OF THE INVENTION

The present invention is made to solve the above-described problems and has for its object to provide an information playback apparatus, an in-line circuit thereof, and a method for implementing the in-line circuit on the information playback apparatus, which are applicable to DVD-RAM playback at low cost without requiring the two external capacitors and the switching signal generation circuit which are required in the conventional in-line circuit for DVD-RAM playback.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided an in-line circuit incorporated in an information playback apparatus, the in-line circuit canceling a difference between a DC offset of an RF signal that is reproduced from an address area of a track formed on an information storage medium, and a DC offset of an RF signal that is reproduced from a data area of the track, and the in-line circuit comprises: a high-pass filter to which the RF signals reproduced from the information storage medium are input; an AD converter to which the output of the high-pass filter is input; and a lag lead filter to which the output of the AD converter is input. Therefore, switching between coupling capacitors, which has been carried out in the conventional in-line circuit, becomes unnecessary, and the capacitance of a capacitor as a component of the high-pass filter can be reduced, whereby the high-pass filter can be incorporated in an integrated circuit without externally providing the capacitor, and further, a timing signal for controlling the switching is not required at all. As a result, considerable reduction in cost can be achieved.

According to a second aspect of the present invention, in the in-line circuit according to the first aspect, the information storage medium is a DVD-RAM disc, and the high-pass filter has a time constant that is sufficiently shorter than the duration of an address area in a playback signal from the DVD-RAM disc. Therefore, DC components of the playback signal can be effectively suppressed.

According to a third aspect of the present invention, in the in-line circuit according to the second aspect, the time constant of the high-pass filter is equal to or shorter than 10% of the duration of the address area in the playback signal from the DVD-RAM disc. Therefore, even when the playback linear velocity varies with an access operation or the like during CLV playback, the effect of suppressing the DC components can be maintained.

According to a fourth aspect of the present invention, in the in-line circuit according to the first aspect, the high-pass filter comprises a resistor and a capacitor, and the capacitor has a capacitance that can be incorporated in an integrated circuit. Therefore, the whole in-line circuit including the high-pass filter can be mounted on the integrated circuit, and an external capacitor can be dispensed with, thereby avoiding an increase in cost due to an increase in the number of terminals of the integrated circuit, resulting in a reduction in cost with an increase in the number of circuits which are mountable onto the integrated circuit.

According to a fifth aspect of the present invention, in the in-line circuit according to the first aspect, the lag lead filter has a frequency characteristic of gain which changes from a lower-frequency-side flat characteristic to a primary integral characteristic at a first corner frequency, and changes from the first integral characteristic to a higher-frequency-side flat characteristic at a second corner frequency; the first corner frequency is a frequency at which a group delay characteristic of the signal after recovery of low-frequency components does not affect data reproduction; and the second corner frequency is a frequency which is approximately equal to a cut-off frequency at which the frequency characteristic of the gain of the high-pass filter changes from the primary differential characteristic to the flat characteristic. Therefore, the low-frequency components can be recovered after AD conversion, whereby the group delay characteristic of the RF signal can be improved.

According to a sixth aspect of the present invention, in the in-line circuit according to the first aspect, the absolute value of inclination of the frequency characteristic of the gain in the primary differential characteristic of the high-pass filter is approximately equal to the absolute value of inclination of the frequency characteristic of the gain in the primary integral characteristic of the lag lead filter. Therefore, the primary differential characteristic of the high-pass filter and the primary integral characteristic cancel each other, whereby the cut-off frequency of the high-pass filter can be shifted toward the higher-frequency side, and the time constant of the high-pass filter can be minimized.

According to a seventh aspect of the present invention, in the in-line circuit according to the first aspect, the time constant of the high-pass filter is set such that the frequency component of the RF signal at the first corner frequency, which is a frequency at which the frequency characteristic of the gain of the lag lead filter changes from the lower-frequency-side flat characteristic to the primary integral characteristic, has an amplitude equal to or larger than 1 LSB (Least Significant Bit) of the AD converter. Therefore, after canceling a DC offset between an ID area and a data area of the optical playback signal, DC components can be recovered from RF components that remain due to the above-mentioned setting of the time constant, using the lag lead filter.

According to an eighth aspect of the present invention, in the in-line circuit according to the first aspect, the optical disc is a DVD-RAM disc, and the frequency characteristics of the high-pass filter and the lag lead filter are varied according to a playback linear velocity of the DVD-RAM disc. Therefore, even when the DVD-RAM disc is played at various playback speeds that are higher than the normal playback speed, the same effects as those obtained in playback at the normal playback speed can be achieved.

According to a ninth aspect of the present invention, in the in-line circuit according to the first aspect, the optical disc is a DVD-RAM disc, and a sampling frequency of the AD converter is set at 2 fmax or higher, and the fmax is represented as follows:

$$f\text{max}=(1/T)\times(N/6)$$

wherein T is equal to 1/29 Mbps (29 Mbps: the channel bit rate of the DVD-RAM), and N means how many times the playback speed of the DVD-RAM is higher than the normal playback speed (N: positive number not less than "1"). Therefore, the optical playback signal after passing through the high-pass filter can be converted into a digital signal without occurring Alias components.

According to a tenth aspect of the present invention, there is provided an information playback apparatus comprising: a high-pass filter to which an RF signal reproduced from an information storage medium is input; an AD converter to which an output of the high-pass filter is input; a lag lead filter to which an output of the AD converter is input; and a demodulator to which an output of the lag lead filter is input; .and the demodulator detects DC level fluctuations in the RF signal whose low-frequency components are recovered by the lag lead filter, thereby detecting an address area in the RF signal. Therefore, detection of an address area can be carried out without providing a special circuit, and an address area can be detected with stability regardless of fluctuations of an optical pickup, resulting in significant reduction in cost.

According to an eleventh aspect of the present invention, in the information playback apparatus according to the tenth aspect, the high-pass filter, the AD converter, the lag lead filter, and the demodulator are incorporated in the same integrated circuit. Therefore, significant reduction in cost can be realized.

According to a twelfth aspect of the present invention, there is provided a method for implementing an in-line circuit for canceling a difference between a DC offset of an RF signal that is reproduced from an address area of a track formed on an information storage medium, and a DC offset of an RF signal that is reproduced from a data area of the track, and the method comprises: setting a cut-off frequency at which a frequency characteristic of a high-pass filter that filters the RF signal as an analog signal changes from a primary differential characteristic to a flat characteristic, to a frequency higher than a target cut-off frequency of the in-line circuit; approximately canceling the primary differential characteristic of the high-pass filter with a primary integral characteristic in a frequency characteristic of a lag lead filter that filters the signal outputted from the high-pass filter and then converted into a digital signal by an AD converter, and setting a cut-off frequency in a total characteristic of the high-pass filter and the lag lead filter to a frequency approximately equal to the target cut-off frequency, thereby reducing the time constant of the high-pass filter, and making the high-pass filter mountable in an integrated circuit. Therefore, the cut-off frequency of the high-pass filter can be shifted toward the higher-frequency side, and the time constant of the high-pass filter can be minimized, whereby the high-pass filter can be incorporated in the integrated circuit without externally providing the capacitor.

According to a thirteenth aspect of the present invention, there is provided a method for implementing an in-line circuit for canceling a difference between a DC offset of an RF signal that is reproduced from an address area of a track formed on an information storage medium, and a DC offset of an RF signal that is reproduced from a data area of the track, and the method comprises: setting a cut-off frequency at which a frequency characteristic of a high-pass filter that filters the RF signal as an analog signal changes from a primary differential characteristic to a flat characteristic, to a frequency higher than a target cut-off frequency of the in-line circuit; setting a first corner frequency at which a frequency characteristic of a lag lead filter that filters the signal outputted from the high-pass filter and then converted into a digital signal by an AD converter changes from a lower-frequency-side flat characteristic to a primary integral characteristic, to a frequency approximately equal to the target cut-off frequency; setting a second corner frequency at which the frequency characteristic of the lag lead filter changes from the primary integral characteristic to a higher-frequency-side flat characteristic, to a frequency approximately equal to the cut-off frequency of the high-pass filter; making the value of inclination of gain decrease due to the primary integral characteristic of the lag lead filter approximately equal to the value of inclination of gain increase due to the primary differential characteristic of the high-pass filter, thereby setting the frequency characteristic of the in-line circuit so that the primary integral characteristic and the primary differential characteristic approximately cancel each other; setting a sampling frequency of the AD converter to 2 fmax or higher, the fmax being represented as follows:

$$f\text{max}=(1/T)\times(N/6)$$

wherein T is equal to ⅟29 Mbps (29 Mbps: the channel bit rate of the DVD-RAM), and N means how many times the playback speed of the DVD-RAM is higher than the normal playback speed (N: positive number not less than "1"); and setting a time constant of the high-pass filter so that the frequency components of the RF signal at the first corner frequency have an amplitude equal to or larger than 1 LSB (Least Significant Bit) of the AD converter, thereby reducing the time constant of the high-pass filter, and making the high-pass filter mountable in an integrated circuit. Therefore, the cut-off frequency of the high-pass filter can be shifted toward the higher-frequency side, and the time constant of the high-pass filter can be reduced, whereby the high-pass filter can be incorporated in the integrated circuit without externally providing a capacitor. Further, the optical playback signal after passing through the high-pass filter can be converted into a digital signal without occurring Alias components, and the DC components can be recovered from the RF components that remain due to the above-mentioned setting of the time constant, using the lag lead filter.

DETAILED DESCRIPTION OF THE PREFERRED EMBODIMENTS

Hereinafter, embodiments of the present invention will be described with reference to FIGS. 1 through 7.

Embodiment 1

Figure 1A:
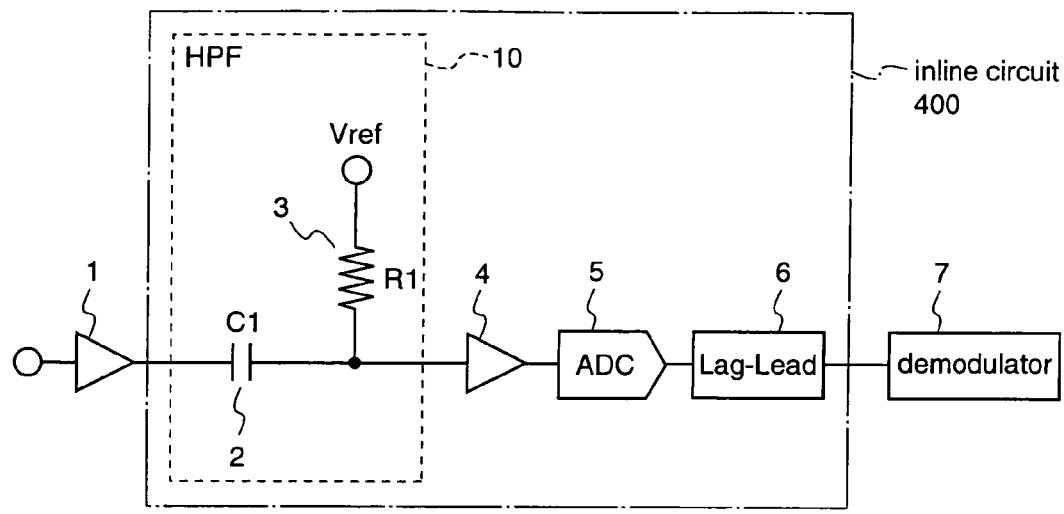
FIG. 1(a) is a block diagram illustrating an optical disc playback apparatus according to a first embodiment of the present invention.

FIG. 1(a) is a block diagram illustrating an optical disc playback apparatus according to a first embodiment of the present invention, wherein an in-line circuit is emphasized.

Figure 8:
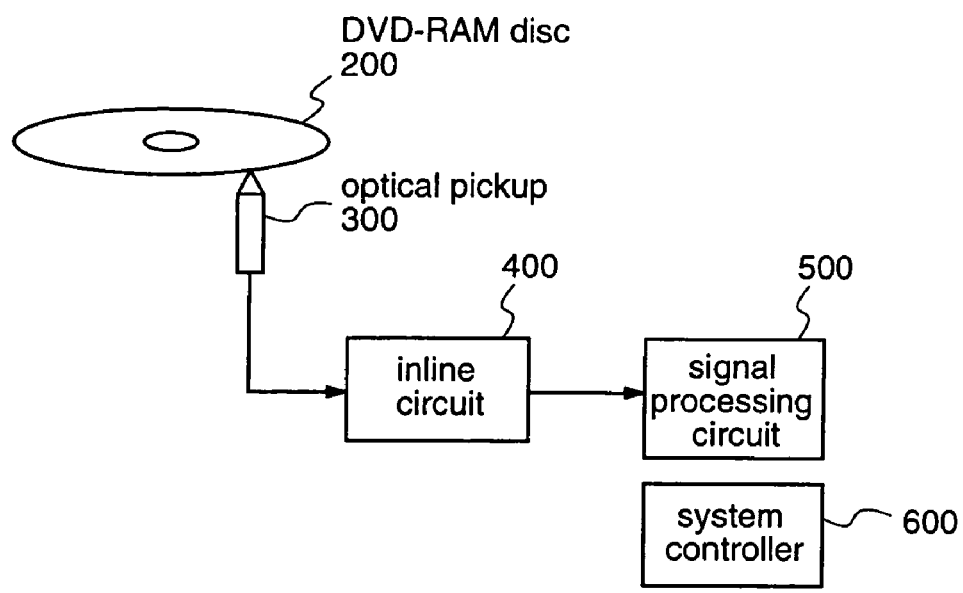
FIG. 8 is a block diagram illustrating the whole construction of the conventional optical disc playback apparatus.

In FIG. 1(a), reference numeral 1 denotes an input amplifier for amplifying an optical playback signal (RF signal) which is a sum signal of output signals from photodetectors A, B, C, and D of an optical pickup 300 shown in FIG. 8; numeral 2 denotes a coupling capacitor located subsequently to the input amplifier 1; and numeral 3 denotes a resistor. The capacitor 2 and the resistor 3 constitute a high-pass filter 10. Reference numeral 4 denotes a buffer amplifier for amplifying an output signal of the high-pass filter 10; numeral 5 denotes an AD converter for analog-to-digital converting an output signal of the buffer amplifier 4; numeral 6 denotes a lag lead filter for giving lag lead characteristics to an output signal of the AD converter 5; and numeral 7 denotes a demodulator for subjecting an output signal of the lag lead filter 6 to demodulation using binarization. An output of the demodulator 7 is processed by a signal processing circuit 500 shown in FIG. 8. An in-line circuit 400 is constituted by the components from the stage subsequent to the input amplifier 1 up to the stage previous to demodulator 7, i.e., the high-pass filter 10, the buffer amplifier 4, the AD converter 5, and the lag lead filter 6.

Figure 1B:
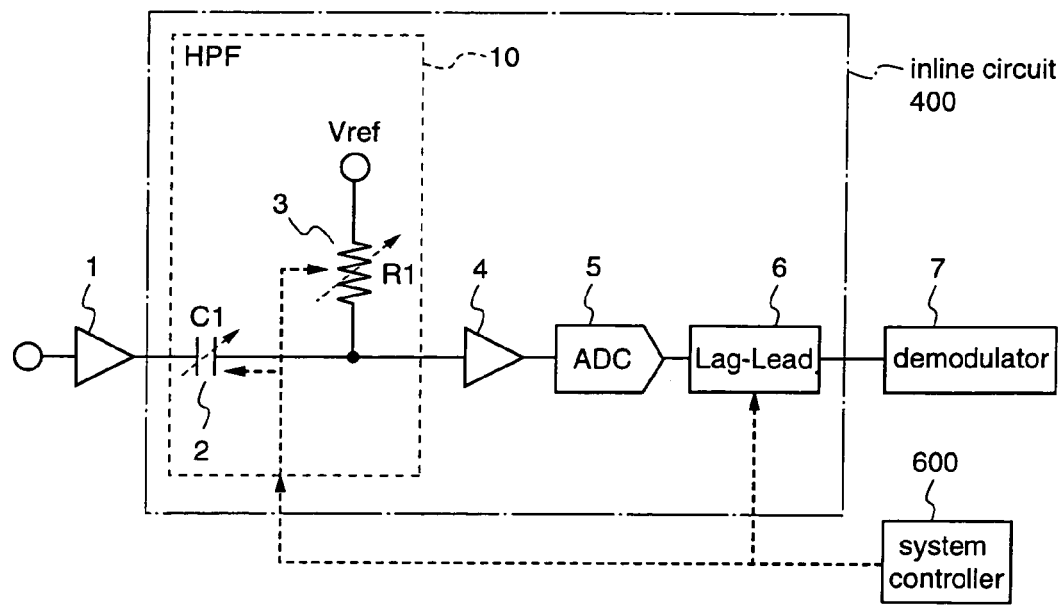
FIG. 1(b) is a block diagram illustrating another construction of an optical disc playback apparatus according to the first embodiment.

Further, as shown in FIG. 1(b), at least one of the capacitor 2 (C1) and the resistor 3 (R1) may have a variable capacitance or a variable resistance, and at least one of the capacitance and the resistance may be controlled by a system controller 600, thereby making the frequency characteristic of the high-pass filter 10 settable. Likewise, the frequency characteristic of the lag lead filter 6 may also be settable.

Figure 1C:
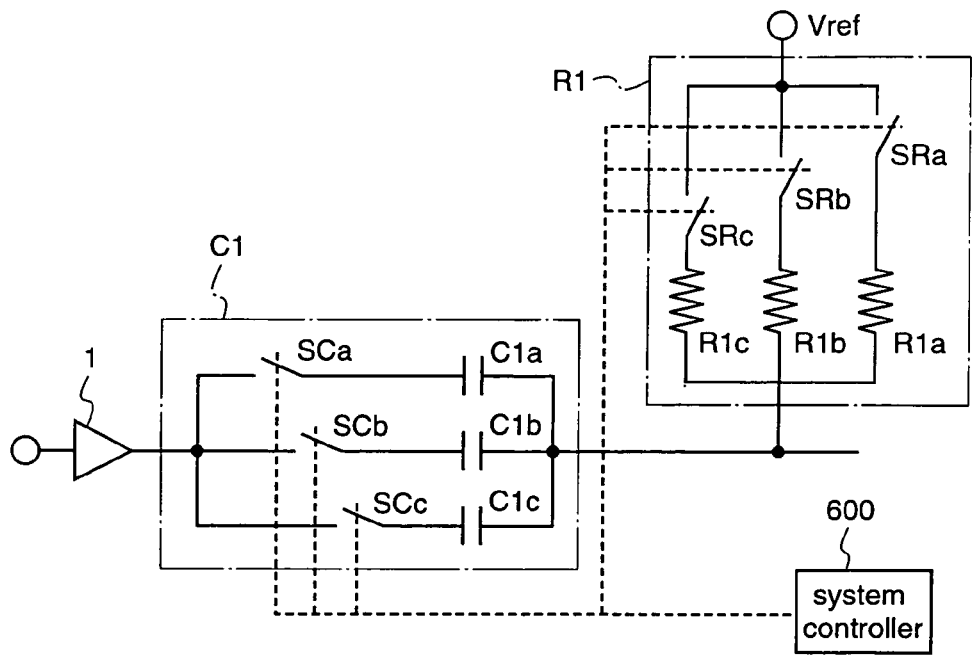
FIG. 1(c) is a circuit diagram illustrating the construction of a high-pass filter shown in FIG. 1(b), in which the resistances and capacitances of resistors and capacitors as components of the high-pass filter are variable.

FIG. 1(c) shows examples of components of the capacitor C1 and the resistor R1 which are shown in FIG. 1(b). In FIG. 1(c), switches SCa, SCb, and SCc are inserted between an output node of the input amplifier 1 and three capacitors C1a, C1b, and C1c which are connected in parallel to each other, respectively, and switches SRa, SRb, and SRc are inserted between a Vref node and three resistors R1a, R1b, and R1c which are connected in parallel to each other, respectively. The switches SCa, SCb, and SCc and the switches SRa, SRb, and SRc are on-off controlled by the system controller 600.

Figure 2:
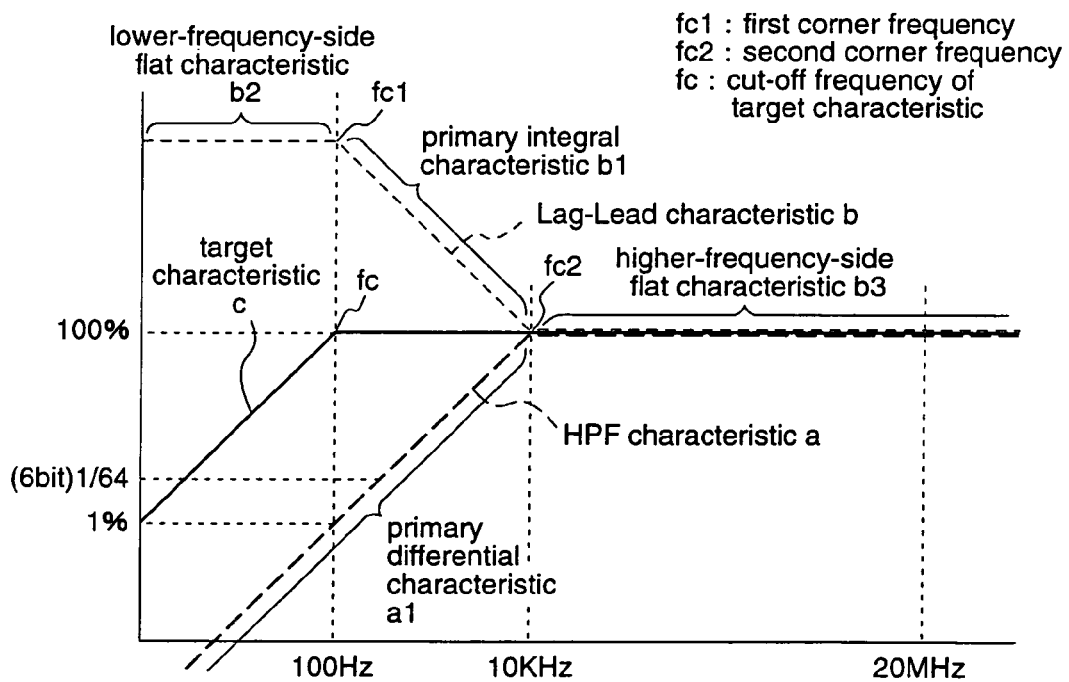
FIG. 2 is a Bode diagram illustrating filter frequency characteristics.

FIG. 2 shows the frequency characteristics of the high-pass filter 10 and the lag lead filter 6, and a target characteristic as a total of these characteristics.

In FIG. 2, "a" shows an example of characteristic of the high-pass filter 10, and it shows primary differential characteristic a1 at frequencies lower than 10 KHz, and flat characteristic (proportional characteristic) at frequencies higher than 10 KHz. Further, "b" shows an example of characteristic of the lag lead filter 6, and it shows primary integral characteristic b1 in an area where the cut-off frequency of the high-pass filter 10 is lower than 10 KHz, lower-frequency-side flat characteristic (proportional characteristic) b2 in an area where the cut-off frequency is lower than 100 Hz, and higher-frequency-side flat characteristic (proportional characteristic) b3 in an area where the cut-off frequency is higher than 10 KHz. In the signal which has passed through the high-pass filter 10 and the lag lead filter 6, the primary differential characteristic a1 and the primary integral characteristic b1 cancel each other and thereby the flat characteristic expands to the lower-frequency side, resulting in target frequency characteristic "c". The target frequency characteristic "c" is equivalent to the frequency characteristic of a high-pass filter having a cut-off frequency of 100 Hz, and does not adversely affect the group delay characteristic of the RF signal component.

In order to realize the target frequency characteristic "c", the in-line circuit 400 is implemented as follows. That is, as shown in FIG. 2, the second corner frequency fc2 of the lag lead filter 6 and the cut-off frequency of the high-pass filter 10 are set at 10 Khz, respectively, and the value of negative inclination of the frequency characteristic of the gain of the primary integral characteristic b1 of the lag lead filter 6 is made equal to the value of positive inclination of the frequency characteristic of the gain of the primary differential characteristic a1 of the high-pass filter 10, whereby the primary integral characteristic b1 and the primary differential characteristic a1 cancel each other, and the target characteristic, i.e., the frequency characteristic obtained by unifying the high-pass filter 10 and the lag lead filter 6, becomes the proportional characteristic that is flat at frequencies lower than 10 KHz. Further, the first corner frequency fc1 of the lag lead filter 6 is set at 100 Hz so as to have the flat characteristic b2 at frequencies lower than 100 Hz, whereby the target frequency becomes the primary differential characteristic at frequencies lower than 100 Hz. The value of the first corner frequency fc1, that is, 100 Hz, is a frequency value at which the group delay characteristic of the signal after recover of low-frequency components does not affect data reproduction.

Hereinafter, the in-line circuit 400 and the method for implementing the in-line circuit 400 will be described in more detail.

Figure 3A:
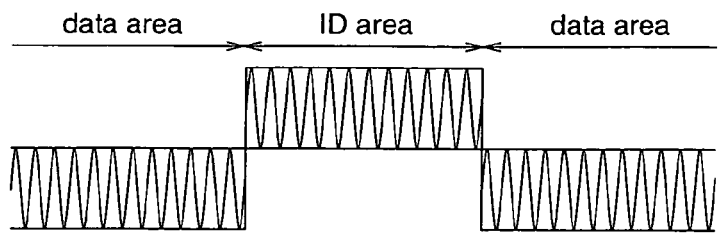
FIG. 3(a) is a signal waveform diagram for explaining the operation of the optical disc playback apparatus according to the first embodiment, illustrating a playback signal to be input to an input amplifier.
Figure 3B:
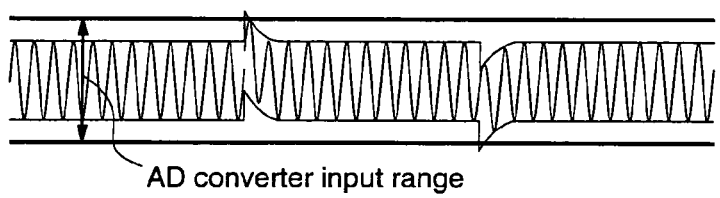
FIG. 3(b) is a signal waveform diagram for explaining the operation of the optical disc playback apparatus according to the first embodiment, illustrating a signal which has passed through the high-pass filter.
Figure 3C:
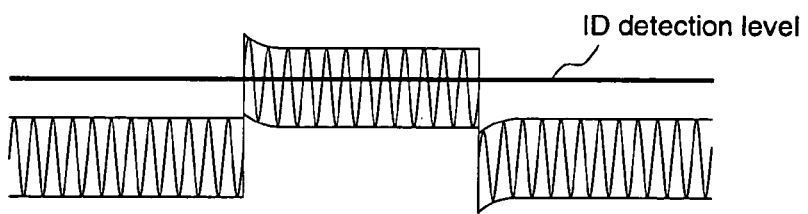
FIG. 3(c) is a signal waveform diagram for explaining the operation of the optical disc playback apparatus according to the first embodiment, illustrating a signal which has passed through a lag lead filter to recover low-frequency components.
Figure 3D:
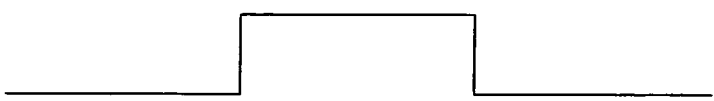
FIG. 3(d) is a signal waveform diagram for explaining the operation of the optical disc playback apparatus according to the first embodiment, illustrating an ID detection signal.

FIGS. 3(a)-3(d) illustrate the signal waveforms of the respective parts of the optical disc playback apparatus shown in FIG. 1. To be specific, FIG. 3(a) shows a playback signal to be input to the input amplifier 1, wherein an area having a relatively high DC level is an ID area (address area) and the other area is a data area. FIG. 3(b) shows a signal which has passed through the high-pass filter 10, FIG. 3(c) shows a signal which has passed through the lag lead filter 6 to recover the low-frequency components, and FIG. 3(d) shows an ID detection signal.

Figure 10A:
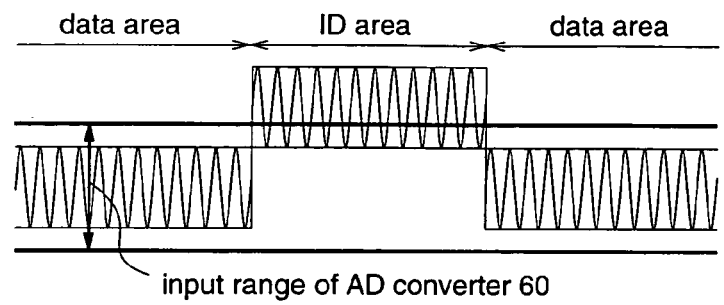
FIG. 10(a) is a signal waveform diagram for explaining the operation of the in-line circuit of the conventional optical disc playback apparatus, illustrating an input signal to an input amplifier.
Figure 10B:
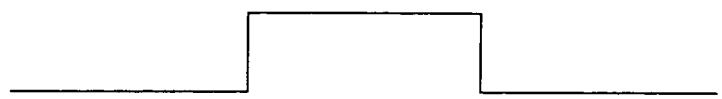
FIG. 10(b) is a signal waveform diagram for explaining the operation of the in-line circuit of the conventional optical disc playback apparatus, illustrating an ID area discrimination signal.
Figure 10C:
FIG. 10(c) is a signal waveform diagram for explaining the operation of the in-line circuit of the conventional optical disc playback apparatus, illustrating a pull-in signal.
Figure 10D:
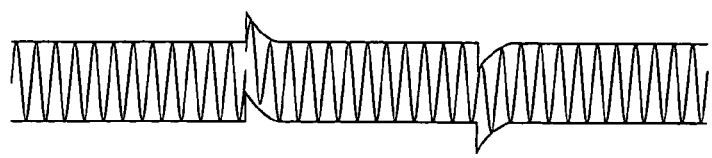
FIG. 10(d) is a signal waveform diagram for explaining the operation of the in-line circuit of the conventional optical disc playback apparatus, illustrating an input signal to an AD converter.
Figure 11:
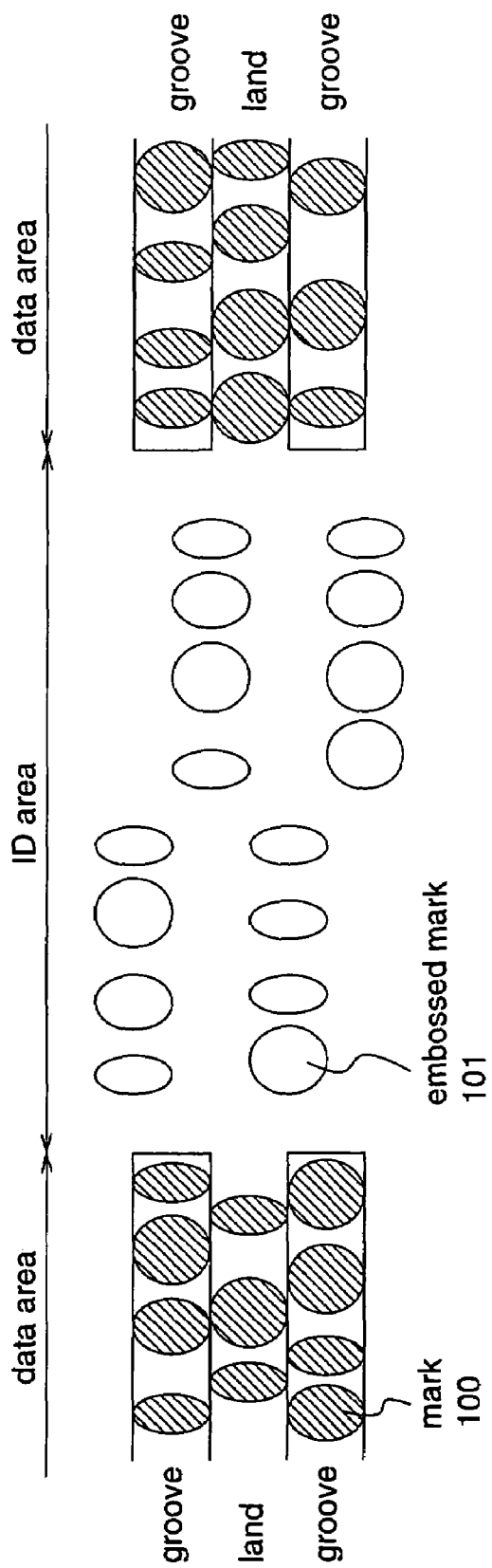
FIG. 11 is a diagram illustrating the structure of an ID part of a DVD-RAM disc.
Figure 12:
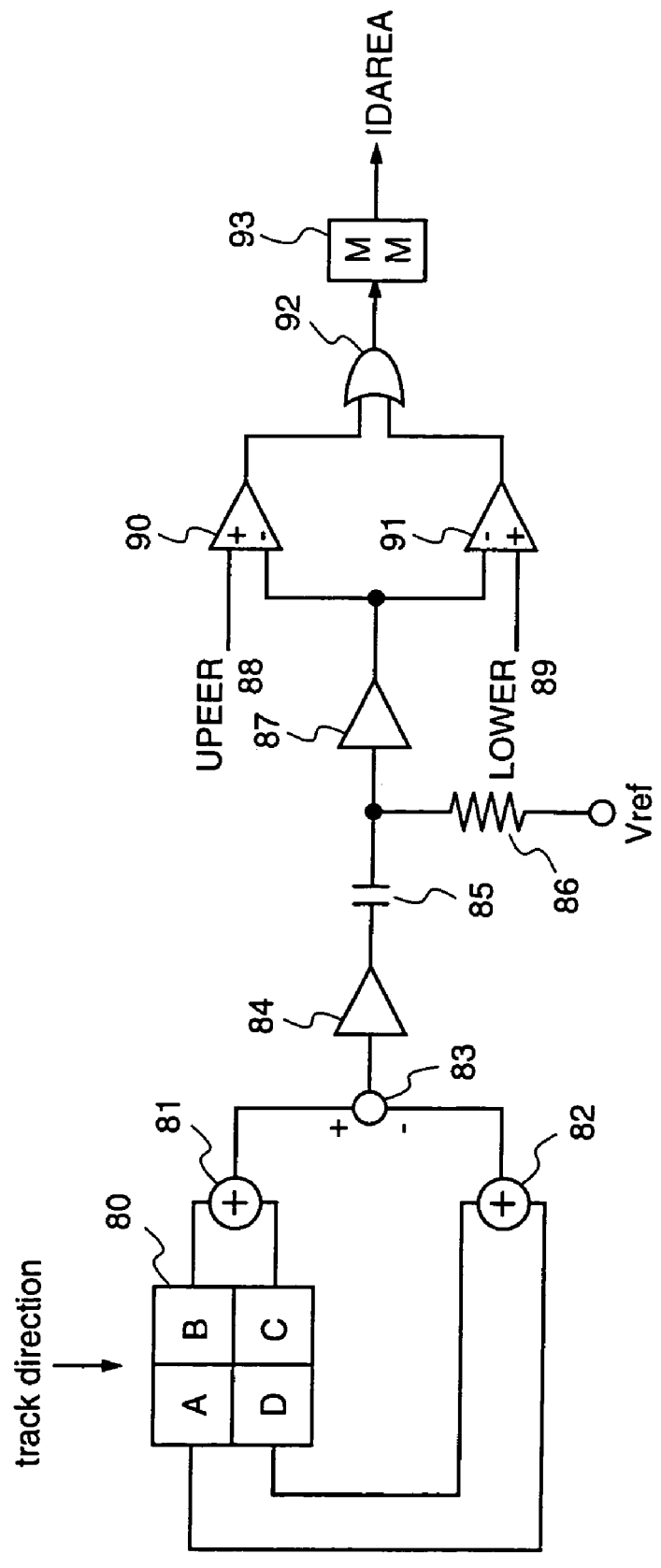
FIG. 12 is a diagram illustrating the construction of the conventional ID area discrimination signal generation circuit.
Figure 13A:
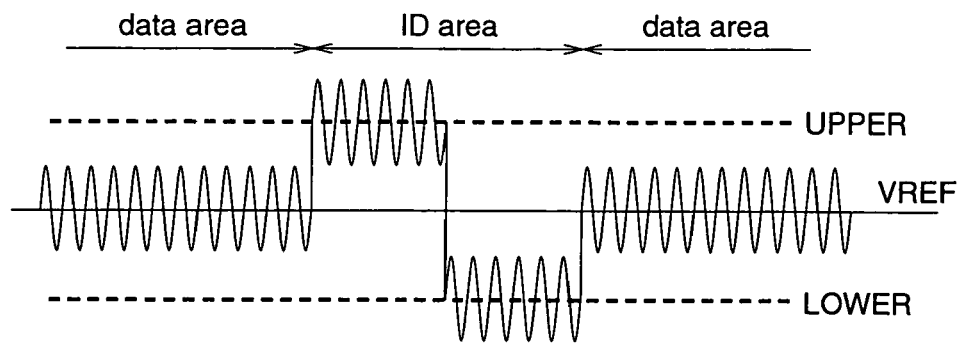
FIG. 13(a) is a signal waveform diagram illustrating a differential RF signal and its two threshold values of the conventional ID area discrimination signal generation circuit.
Figure 13B:
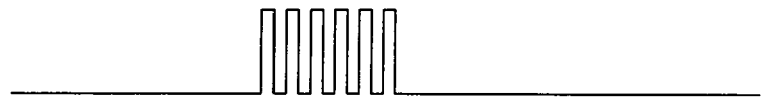
FIG. 13(b) is a signal waveform diagram illustrating the state of the conventional ID area discrimination signal generation circuit wherein an offset of the differential RF signal in the ID area is detected.
Figure 13C:
FIG. 13(c) is a signal waveform diagram illustrating the state of the conventional ID area discrimination signal generation circuit wherein an offset of the differential RF signal in the ID area is detected.
Figure 13D:
FIG. 13(d) is a signal waveform diagram illustrating an ID area discrimination signal detected by the conventional ID area discrimination signal generation circuit.

During DVD-RAM playback, a playback signal (refer to FIG. 3(a)) similar to that shown in FIG. 10(a) is inputted.

This playback signal is amplified by the input amplifier 1 shown in FIG. 1(a), and the lower frequencies thereof are suppressed by the high-pass filter 10, whereby a DC offset in the ID area is canceled. Thereafter, the signal is amplified by the buffer amplifier 4, and converted into a multiple-bit digital signal by the AD converter 5. Then, low-frequency components of the multiple-bit digital signal, which have been suppressed by the high-pass filter 10, are recovered by the lag lead filter 6, and then the multiple-bit digital signal is binarized by the demodulator 7, and the original signal processing is carried out in the subsequent stage, whereby information recorded in the DVD-RAM is reproduced.

The high-pass filter 10 and the lag lead filter 6 realize, in total, the high-pass filter characteristic, and the DC components in the optical playback signal are removed without adversely affecting the group delay characteristic of the RF signal.

The first corner frequency fc1 of the lag lead filter 6 determines the cut-off frequency of the high-pass filter characteristic, and the primary differential characteristic a1 of the high-pass filter 10 at frequencies higher than the first corner frequency fc1 is canceled with the primary integral characteristic b1 of the lag lead filter 6 at frequencies higher than the first corner frequency fc1, thereby to obtain the flat proportional characteristic. In order to realize the flat proportional characteristic, as described above, the cut-off frequency of the high-pass filter 10 and the second corner frequency fc2 of the lag lead filter 6 are made equal to each other and, simultaneously, the value of the negative inclination of the primary integral characteristic b1 and the value of the positive inclination of the primary differential characteristic a1 are made equal to each other.

In the first embodiment of the present invention, DC level fluctuations that occur during playback of the ID area are removed using the simple high-pass filter 10 to obtain the waveform shown in FIG. 3, whereby the dynamic range of the optical playback signal is compressed so as to remain within the input range of the AD converter 5. Therefore, AD conversion can be carried out for both of the data area and the ID area.

Therefore, setting of the cut-off frequency of the high-pass filter 10 is important. Since the duration of the ID area at a playback speed with which the channel bit rate becomes 29 Mbps is about 75 μsec, the time constant of the high-pass filter must be set at a value that is sufficiently smaller than the duration. For example, when the cut-off frequency is 10 KHz as shown by "a" in FIG. 2, the time constant becomes 16 μsec, which is ⅕ of the duration of the ID area and is adequate for suppressing the DC components.

Further, when the playback speed (N times as high as the normal playback speed) is increased, the duration of the ID area is shortened, and the cut-off frequency of the high-pass filter must be shifted toward the higher-frequency side. With this shift, the second corner frequency of the lag lead filter 6 must be shifted toward the higher-frequency side. These shifts can be realized by giving a control signal from the system controller 600 to the high-pass filter and the lag lead filter 6 as shown in FIG. 1(*b*).

In order to make suppression of DC components possible against fluctuations in the playback linear velocity due to an access operation or the like during CLV playback, the time constant of the high-pass filter 10 must be set at a value sufficiently shorter than the duration of the ID area in the DVD-RAM playback signal, for example, lower than 10% of the duration.

However, with the DC components being kept suppressed, the playback signal is affected by the phase rotation due to the high-pass filter 10, and the group delay characteristic is degraded. Therefore, after AD conversion, the low-frequency components are recovered by the lag lead filter 6, whereby degradation in the group delay characteristic is suppressed, resulting in the signal shown in FIG. 3(*c*).

That is, as can be seen from the lag lead characteristic "b" shown in FIG. 2, the gain in the low-frequency area is increased by the lag lead filter 6 having cut off frequencies at 100 Hz (first corner frequency fc1) and 10 KHz (second corner frequency fc2), whereby the signal that has passed through the high-pass filter 10 and the lag lead filter 6 becomes equivalent to the signal that has passed through the high-pass filter having a cut-off frequency of 100 Hz as shown by "c" in FIG. 2.

Using such high-pass filter having a cut-off frequency of 100 Hz, influence of the phase rotation on the RF band can be reduced to a sufficiently low level.

Further, as described above, a high-pass characteristic having a cut-off frequency of 100 Hz like the conventional one is realized by using the lag lead filter 6 and the high-pass filter 10. Since the gain of the low-frequency components is compensated by the lag lead filter 6, the cut-off frequency of the high-pass filter 10 can be set to 10 KHz, whereby the time constant of the high-pass filter 10 can be minimized.

Therefore, the capacitance of the capacitor 2 as a component of the high-pass filter 10 can be reduced, whereby the whole in-line circuit 400 can be housed in the LSI, without providing the capacitor 2 externally.

Now it is examined as to whether or not the low-frequency components removed by the high-pass filter 10 can actually be recovered after AD conversion.

Figure 4:
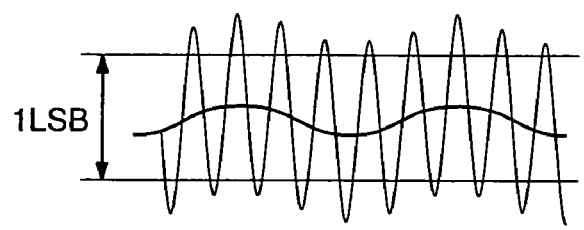
FIG. 4 is a signal waveform diagram illustrating an optical playback signal on which RF components are superposed.

If the frequency characteristic of the high-pass filter 10 relates to a single frequency, the signal of 100 z is ¹⁄₁₀₀ of the signal of 10 KHz as shown in FIG. 2. Therefore, assuming that the AD converter 5 has resolution of 6 bits, the result of AD conversion undesirably becomes lower than ¹⁄₆₄ of the resolution, that is, completely zero. So, it is impossible to recover the low-frequency components by the lag lead filter 6. However, since the optical disc playback signal has RF components as shown in FIG. 4, when the level of the RF components is set so as to exceed the resolution of the AD converter, the RF components effectively act as dither, and the low-frequency components equal to and lower than 100 Hz remain as data that disperse among the sampling data. The lag lead filter 6 functions as an integrator for the dispersed data, and recovers these data to reconstruct the low-frequency components.

In order to realize recovery of the low-frequency components, the time constant of the high-pass filter 10 must be set so that the frequency components of the RF signal at the first corner frequency fc1 (=100 Hz) have an amplitude equal to or larger than 1 LSB of the AD converter 5. That is, if the cut-off frequency of the high-pass filter 10 is set excessively high, attenuation in the lower-frequency band undesirably increases. Therefore, this point should be noted when setting the cut-off frequency.

Moreover, setting of the sampling frequency of the AD converter 5 is also important, and the sampling frequency must be set to 2 fmax or higher.

By setting the sampling frequency to 2 fmax or higher, it becomes possible to prevent Alias components from occurring when the optical playback signal after removal of the DC fluctuation components by the high-pass filter 10 is subjected to AD conversion.

$$f\text{max}=(1/T)\times(N/6) \tag{1}$$

wherein T=¹⁄₂₉ Mbps (29 Mbps: channel bit rate of DVD-RAM), and N means how many times the playback speed of the DVD-RAM is higher than the normal playback speed (N: positive number not less than "1".

Figure 5:
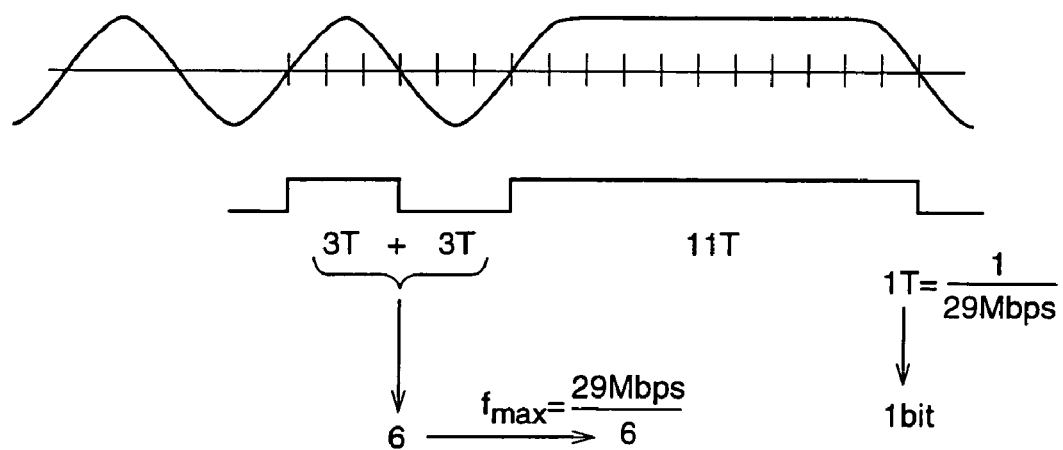
FIG. 5 is a diagram for explaining the principle for deriving a calculation formula of a sampling rate of an AD converter which is required for recovering the low-frequency components after passing through the lag lead filter.

In formula (1), "6" is derived from that three or more "1" and three or more "0" are continuously recorded on the DVD-RAM as shown in FIG. 5.

Figure 6:
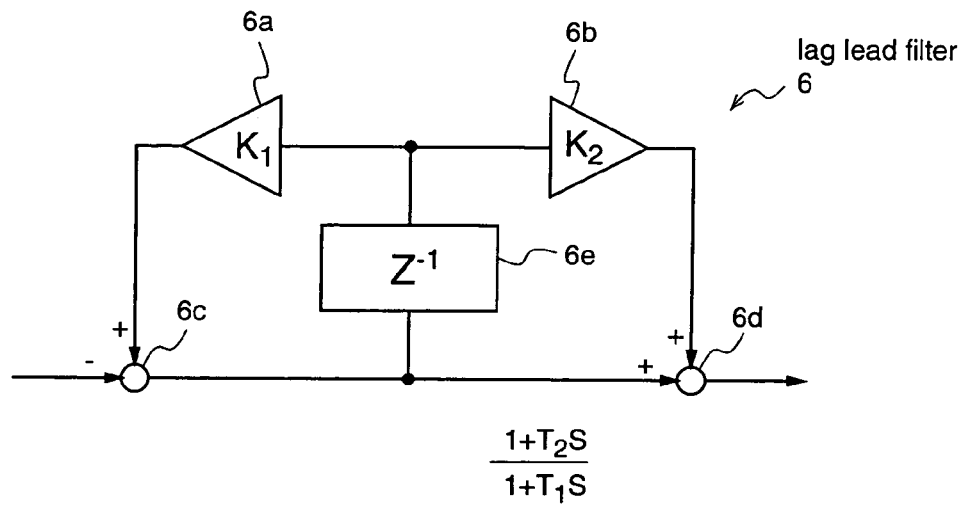
FIG. 6 is a diagram illustrating the fundamental construction of the lag lead filter.

Further, the lag lead filter 6 is a combination of a low-pass filter and a high-pass filter, and it can be constituted as a perfect digital filter by using multipliers 6*a* and 6*b*, adders 6*c* and 6*d*, and a delay unit 6*e*, as shown in FIG. 6 illustrating the fundamental construction thereof. Therefore, the cut-off frequency of 100 Hz can easily be realized and, further, it can be constituted at low cost.

Next, data reproduction will be described.

In the conventional example, since the signal to be AD converted is one from which DC level fluctuations are removed, detection of the ID area must be carried out by using a completely different system of circuit. In the present invention, however, since the DC level of the playback signal can be recovered as shown in FIG. 3(*c*), DC level fluctuations can be detected by setting the ID detection level as shown in FIG. 3(*c*).

As for the ID detection level, an intermediate value between the value of the upper envelope in the data area and the value of the upper envelope in the ID area in the waveform shown in FIG. 3(*c*) can be experimentally obtained. Particularly, since the value of the upper envelope in the ID area is approximately known, a level that is a predetermined value lower than the known value can be used as the ID detection level.

FIG. 3(*d*) shows the ID detection result. For example, by switching the binarization slice level according to this signal, the playback signals in the data area and in the ID area can be binarized to obtain data.

Figure 7:
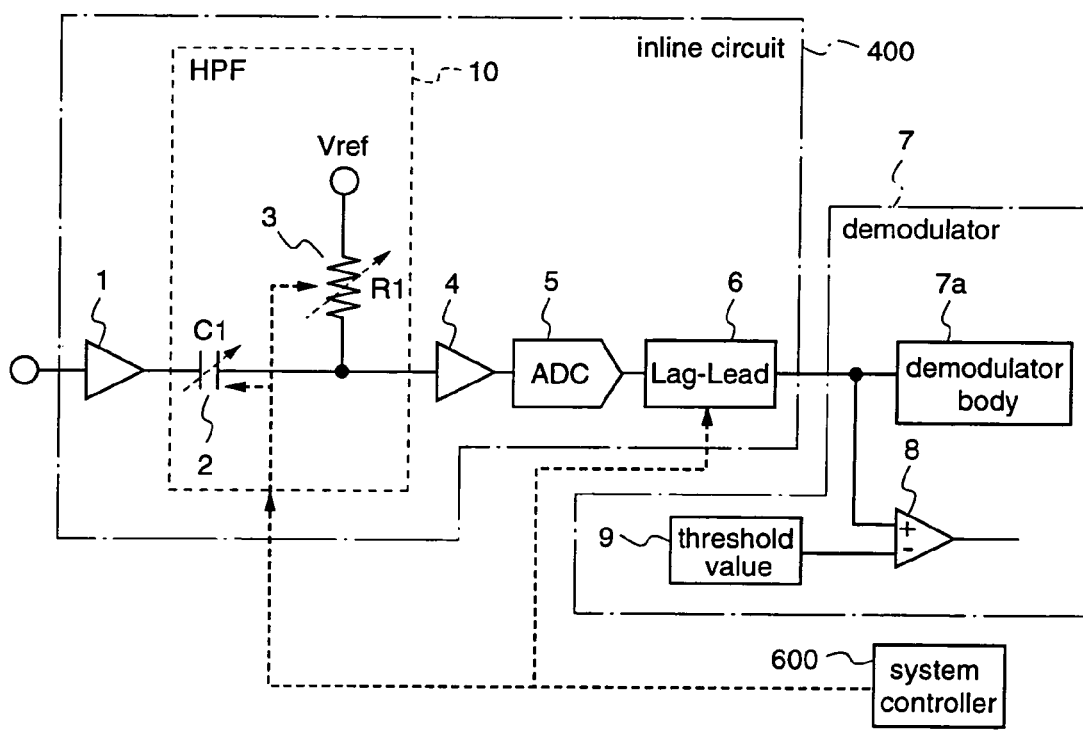
FIG. 7 is a block diagram illustrating the construction of a demodulator included in the optical disc playback apparatus according to the first embodiment.

FIG. 7 is a block diagram of an optical disc playback apparatus according to the first embodiment of the present invention, which enables the above-mentioned data playback operation. In FIG. 7, the same reference numerals as those shown in FIG. 1 denote the same or corresponding parts. In FIG. 7, reference numeral 7a denotes a demodulator body having the same function as the demodulator 7 shown in FIG. 1, numeral 8 denotes a comparator for comparing an output signal of the lag lead filter 6 with a threshold value, numeral 9 denotes a threshold generator for generating the threshold value, numeral 7 denotes a demodulator comprising the demodulator body 7a, the comparator 8, and the threshold generator 9. A threshold value that is experimentally obtained as described above is set on the threshold generator 9.

In FIG. 7, the comparator 8 compares the output signal of the lag lead filter 6 with the threshold value. The RF signal in which the low-frequency components are recovered by the lag lead filter 6 is shown in FIG. 3(c), and the threshold value is set on the level that is shown as the ID detection level in FIG. 3(c), whereby an ID area detection signal that becomes "H" in a period corresponding to the ID area can be obtained.

Figure 9:
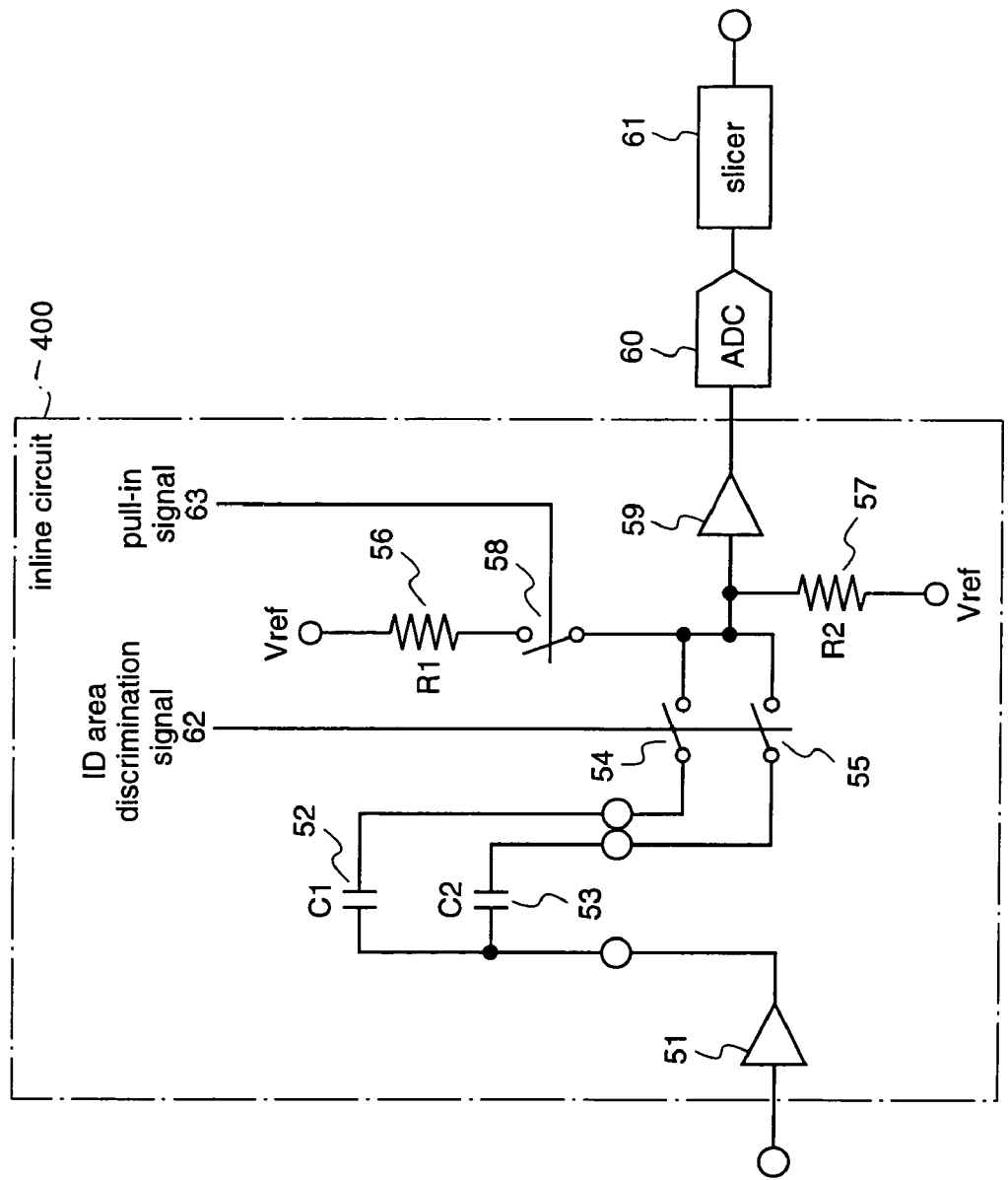
FIG. 9 is a circuit diagram illustrating the construction of the in-line circuit of the conventional optical disc playback apparatus.

The ID area detection signal can be generated without requiring a large-scale special circuit as shown in FIG. 9. Further, the input amplifier receives the sum of the output signals from the photodetectors A, B, C, and D of the optical pickup 300, and the push-pull signals of the photodetectors are not used. Therefore, in contrast to the case where the push-pull signals are used, it is possible to detect the ID area without being affected by variations in the optical pickup or tracking servo.

To be specific, when using the push-pull signals of the photodetectors in detecting the ID area, the offset amount of the differential signal in the ID area might be considerably asymmetrical with respect to the upper side and the lower side due to a deviation of the optical axis of the pickup, a positional error of the photoreceptor, or the like. In this case, detection of one of the upper and lower ID areas cannot be carried out, resulting in a trouble in the in-line processing. However, in the first embodiment using the sum signal, since the level of the upper envelope of the RF signal in the ID area is a reflection level from the mirror portion of the ID area, i.e., a portion having no embossed marks, the trouble in the in-line processing is avoided, which is caused by that detection of the ID area cannot be carried out due to the mechanical mounting accuracy of the constituents of the pickup.

Also in the optical disc playback apparatus, when the DVD-RAM disc performs playback at a speed N times as high as the normal speed, the characteristics of the high-pass filter 10 and the lag lead filter 6 must be changed according to the playback speed. The characteristic of the high-pass filter 10 or the lag lead filter 6 can be changed by changing the time constant of the high-pass filter 10 or the multiplication coefficients of the lag lead filter 6 under control of the system controller, like the above-mentioned in-line circuit.

Further, while in the present invention the second corner frequency fc2 of the lag lead filter 6 (=10 KHz) is made agree with the cut-off frequency of the high-pass filter 10 indicating the primary differential characteristic, these frequencies are not necessarily in perfectly agreement with each other. For example, an error of 10% or less is allowable.

Further, while in the present invention the primary integral characteristic of the lag lead filter 6 and the primary differential characteristic of the high-pass filter 10 cancel each other out. However, these characteristics are not necessarily in perfect cancellation with each other. Either or both of the primary integral characteristic and the primary differential characteristic may slightly remain in the total characteristic of the lag lead filter 6 and the high-pass filter 10. For example, a residual amount of 10% or less with respect to the proportional characteristic is allowable.

Further, while in the present invention the capacitor 2 as a component of the high-pass filter 10 is not externally provided but incorporated in the LSI, the demodulation circuit 7 and the subsequent signal processing circuit as well as the whole in-line circuit 400 may be incorporated in the LSI.

Further, while in the present invention both of the capacitor 2 and the resistor 3 shown in FIG. 1(b) are variable, either the capacitor 2 or the resistor 3 may be constant, and the constructions of the capacitor 2 and the resistor 3 are not restricted to FIG. 1(c).

Furthermore, when playback of the DVD-RAM disc at a speed N times as high as the normal speed is not carried out, both of the capacitor 2 and the resistor 3 may be constant.

Further, while in the present invention the threshold generator 9 of the demodulator 7 previously sets the threshold value that is experimentally obtained, a circuit that determines a threshold value in real time from the waveform of FIG. 3(c) may be provided.

Further, while the present invention is applied to an optical disc playback apparatus adaptable to DVD-RAM discs as an information playback apparatus, the present invention is also applicable to an optical disc playback apparatus and an optical disc recording/playback apparatus which are adaptable to playback of optical discs other than DVD-RAM discs so long as it includes the function of playing DVD-RAM discs.

As described above, the information playback apparatus according to the first embodiment of the present invention is provided with the input amplifier which receives an RF signal reproduced from an optical disc; a high-pass filter to which the output of the input amplifier is input; an AD converter to which the output of the high-pass filter is input; a lag lead filter to which the output of the AD converter is input; and a demodulator which digitally processes the output of the lag lead filter and demodulates it as a binarized signal. Therefore, in contrast to the conventional apparatus, switching between coupling capacitors becomes unnecessary, and the capacitance of the capacitor as a component of the high-pass filter can be reduced, whereby the high-pass filter can be incorporated in the LSI. Further, a timing signal for controlling the switching is not required at all. As a result, considerable reduction in cost can be achieved.

Further, the information playback apparatus is provided with a high-pass filter to which an RF signal reproduced from an optical disc is input; an AD converter to which the output of the high-pass filter is input; a lag lead filter to which the output of the AD converter is input; and a demodulator to which the output of the lag lead filter is input. The demodulator detects DC level fluctuations in the RF signal whose low-frequency components have been recovered by the lag lead filter, thereby detecting the ID area. Therefore, detection of the ID area becomes possible, and an increase in cost due to provision of a special circuit is avoided. Further, detection of the ID area can be carried out without using push-pull signals from the photodetectors of the optical pickup, whereby detection of the ID area can be carried out with stability, independently of fluctuations in the pickup.

As described above, according to the present invention, an optical disc playback apparatus that realizes more stable DVD-RAM playback function at reduced cost is obtained, and the in-line circuit is suitable to such optical disc playback apparatus.

What is claimed is:
1. An in-line circuit incorporated in an information playback apparatus, the in-line circuit canceling a difference between a DC offset of an RF signal that is reproduced from an address area of a track formed on an information storage medium, and a DC offset of an RF signal that is reproduced from a data area of the track, said in-line circuit comprising:
- a high-pass filter to which the RF signals reproduced from the information storage medium are input;
- a multi-bit AD converter which receives the output of the high-pass filter and has an output of at least 2 bits; and
- a lag lead filter to which the output of the AD converter is input,
- wherein said lag lead filter has a frequency characteristic of gain which changes from a lower-frequency-side flat characteristic to a primary integral characteristic at a first corner frequency, and changes from the primary integral characteristic to a higher-frequency-side flat characteristic at a second corner frequency,
- wherein said first corner frequency is a frequency at which a group delay characteristic of the signal after recovery of low-frequency components does not affect data reproduction, and
- wherein said second corner frequency is a frequency which is approximately equal to a cut-off frequency at which the frequency characteristic of the gain of the high-pass filter changes from the primary differential characteristic to the flat characteristic.

2. An in-line circuit incorporated in an information playback apparatus, the in-line circuit canceling a difference between a DC offset of an RF signal that is reproduced from an address area of a track formed on an information storage medium, and a DC offset of an RF signal that is reproduced from a data area of the track, said in-line circuit comprising:
- a high-pass filter to which the RF signals reproduced from the information storage medium are input;
- a multi-bit AD converter which receives the output of the high-pass filter and has an output of at least 2 bits; and
- a lag lead filter to which the output of the AD converter is input,
- wherein the absolute value of inclination of a frequency characteristic of gain in a primary differential characteristic of the high-pass filter is approximately equal to the absolute value of inclination of a frequency characteristic of gain in a primary integral characteristic of the lag lead filter.

3. An in-line circuit incorporated in an information playback apparatus, the in-line circuit canceling a difference between a DC offset of an RF signal that is reproduced from an address area of a track formed on an information storage medium, and a DC offset of an RF signal that is reproduced from a data area of the track, said in-line circuit comprising:
- a high-pass filter to which the RF signals reproduced from the information storage medium are input;
- a multi-bit AD converter which receives the output of the high-pass filter and has an output of at least 2 bits; and
- a lag lead filter to which the output of the AD converter is input,
- wherein the time constant of the high-pass filter is set such that a frequency component of the RF signal at a first corner frequency, which is a frequency at which the frequency characteristic of gain of the lag lead filter changes from a lower-frequency-side flat characteristic to a primary integral characteristic, has an amplitude equal to or larger than 1 LSB (Least Significant Bit) of the AD converter.

4. An in-line circuit incorporated in an information playback apparatus, the in-line circuit canceling a difference between a DC offset of an RF signal that is reproduced from an address area of a track formed on an information storage medium, and a DC offset of an RF signal that is reproduced from a data area of the track, said in-line circuit comprising:
- a high-pass filter to which the RF signals reproduced from the information storage medium are input;
- a multi-bit AD converter which receives the output of the high-pass filter and has an output of at least 2 bits; and
- a lag lead filter to which the output of the AD converter is input,
- wherein said information storage medium is a DVD-RAM disc, and
- wherein a sampling frequency of said AD converter is set at 2fmax or higher, and the fmax is represented as follows:

$$f\text{max}=(1/T)\times(N/6)$$

wherein T is equal to 1/29 Mbps (29 Mbps: the channel bit rate of the DVD-RAM), and N means how many times the playback speed of the DVD-RAM is higher than the normal playback speed (N: positive number not less than "1").

5. A method for implementing an in-line circuit for canceling a difference between a DC offset of an RF signal that is reproduced from an address area of a track formed on an information storage medium, and a DC offset of an RF signal that is reproduced from a data area of the track, said method comprising:
- setting a cut-off frequency at which a frequency characteristic of a high-pass filter that filters the RF signal as an analog signal changes from a primary differential characteristic to a flat characteristic, to a frequency higher than a target cut-off frequency of the in-line circuit;
- approximately canceling the primary differential characteristic of the high-pass filter with a primary integral characteristic in a frequency characteristic of a lag lead filter that filters the signal outputted from the high-pass filter and then converted into a digital signal by an AD converter, and setting a cut-off frequency in a total characteristic of the high-pass filter and the lag lead filter to a frequency approximately equal to the target cut-off frequency, thereby reducing the time constant of the high-pass filter, and making the high-pass filter mountable in an integrated circuit.

6. A method for implementing an in-line circuit for canceling a difference between a DC offset of an RF signal that is reproduced from an address area of a track formed on an information storage medium, and a DC offset of an RF signal that is reproduced from a data area of the track, said method comprising:
- setting a cut-off frequency at which a frequency characteristic of a high-pass filter that filters the RF signal as an analog signal changes from a primary differential characteristic to a flat characteristic, to a frequency higher than a target cut-off frequency of the in-line circuit;
- setting a first corner frequency at which a frequency characteristic of a lag lead filter that filters the signal outputted from the high-pass filter and then converted into a digital signal by an AD converter changes from a lower-frequency-side flat characteristic to a primary integral characteristic, to a frequency approximately equal to the target cut-off frequency;
- setting a second corner frequency at which the frequency characteristic of the lag lead filter changes from the primary integral characteristic to a higher-frequency-side flat characteristic, to a frequency approximately equal to the cut-off frequency of the high-pass filter;
- making the value of inclination of gain decrease due to the primary integral characteristic of the lag lead filter approximately equal to the value of inclination of gain increase due to the primary differential characteristic of the high-pass filter, thereby setting the frequency characteristic of the in-line circuit so that the primary integral characteristic and the primary differential characteristic approximately cancel each other;

setting a sampling frequency of the AD converter to 2 fmax or higher, said fmax being represented as follows:

$f\text{max}=(1/T)\times(N/6)$ wherein T is equal to 1/29 Mbps (29 Mbps: the channel bit rate of the DVD-RAM), and N means how many times the playback speed of the DVD-RAM is higher than the normal playback speed (N: positive number not less than "1"); and setting a time constant of the high-pass filter so that the frequency components of the RF signal at the first corner frequency have an amplitude equal to or larger than 1 LSB (Least Significant Bit) of the AD converter, thereby reducing the time constant of the high-pass filter, and making the high-pass filter mountable in an integrated circuit.

* * * * *